United States Patent [19]

Ho

[11] Patent Number: 5,757,365
[45] Date of Patent: May 26, 1998

[54] POWER DOWN MODE FOR COMPUTER SYSTEM

[75] Inventor: Simon Ho, Vancouver, Canada

[73] Assignee: Seiko Epson Corporation, Tokyo, Japan

[21] Appl. No.: 487,115

[22] Filed: Jun. 7, 1995

[51] Int. Cl.$^6$ .................................................. G09G 5/00
[52] U.S. Cl. ........................ 345/212; 395/750.03; 364/707
[58] Field of Search ................................ 345/212, 211, 345/89, 97, 147, 98, 204; 364/707; 395/750.01, 750.03, 750.06

[56] References Cited

U.S. PATENT DOCUMENTS

| 4,450,442 | 5/1984 | Tanaka | 340/814 |
|---|---|---|---|
| 4,468,662 | 8/1984 | Tanaka | 340/789 |
| 4,626,837 | 12/1986 | Priestly | 340/723 |
| 4,926,166 | 5/1990 | Fujisawa et al. | 340/717 |
| 5,047,759 | 9/1991 | Takebe et al. | 340/789 |
| 5,247,286 | 9/1993 | Ishikawa | 345/3 |
| 5,347,630 | 9/1994 | Ishizawa et al. | 395/164 |

FOREIGN PATENT DOCUMENTS

| 0 498 148 | 8/1992 | European Pat. Off. | |
| 0 655 725 | 5/1995 | European Pat. Off. | |
| 406059653 | 3/1994 | Japan | 345/212 |
| 406059655 | 3/1994 | Japan | 345/212 |
| 0368117 | 5/1990 | United Kingdom | 345/97 |
| 0645692 | 3/1995 | United Kingdom | 345/212 |

*Primary Examiner*—Regina Liang
*Attorney, Agent, or Firm*—Michael T. Gabrik

[57] ABSTRACT

A computer system includes a CPU and VGA/LCD controller interacting with a main system memory for processing input data and displaying it on an LCD panel screen that includes a plurality of row and column drive chips on the panel. Each column drive chip includes a panel driver memory and panel driver control logic. A frame rate modulated grey-scale data signal is fed from the processor and VGA/LCD controller to the panel driver memory. Timing signals, including horizontal and vertical clocks, and data shift signals, are fed to the panel driver control circuit to control the panel driver memory from which data is read out for display on the LCD panel screen. Upon detection of the absence of screen update information for two full frame periods the system enters a power down mode by re-mapping the grey-scale data to black-and-white data, stopping the data shift clock, and disabling portions of the VGA/LCD controller and its sequencer so that the latter enters a screen off mode. Stopping of the data shift clock causes the display panel and its panel driver memory to enter a self-refresh mode in which a frame of data stored in the panel driver memory is repetitively read out under control of the vertical and horizontal clock signals.

22 Claims, 4 Drawing Sheets

FIG.–5a INTERNAL VRTC
FIG.–5b YD
FIG.–5c MEMORY OR I/O WRITE
FIG.–5d REMAP TO B/W PIXELS
FIG.–5e VGA CONTROLLER LOGIC DISABLE
FIG.–5f SELF REFRESH

POWER DOWN MODE FOR COMPUTER SYSTEM

BACKGROUND OF THE INVENTION

1. Field of the Invention

The present invention relates to information processing equipment, such as a personal computer or word processor, and more particularly concerns power conservation for such equipment.

2. Description of Related Art

As use of portable personal computers spreads they become more sophisticated and more powerful. Additional functions and features are added. Power demands of the portable personal computer, which are always a major concern, increase with increased capabilities. The greater demands increase the importance of minimizing energy consumption. In addition to improvements in life and efficiency of batteries that power the personal computer, energy savings, and thus increased battery life at higher power, can be achieved by shutting down portions of the computer when appropriate. Prior power saving arrangements have included various types of manual shut downs and systems that operate to shut down after the lapse of a fixed time interval. In many such systems the screen is completely shut off or may continue to be refreshed from information provided from the main system memory and the CPU and its VGA/LCD display controller. However, in some situations a complete shut off of the display may not be desired.

Further, use of manually controlled shut down modes or shut down provided after a fixed time interval will not provide an optimum period of power down operation.

Applicant is not aware of any prior system that provide for optimum periods of decreased power operation without undesirable degradation of the display or without loss of desirable features of the display capability.

Accordingly, it is an object of the present invention to provide a computer or information processing system in which above mentioned problems are minimized or avoided.

SUMMARY OF THE INVENTION

In carrying out principles of the present invention in accordance with a preferred embodiment thereof, a computer system comprises an information processor for storing and processing information and including a display controller, a display panel for receiving update data from said information processor, and means responsive to absence of update data for a predetermined number of frames for disabling portions of said information processor. The display panel includes a panel memory that stores a frame of data so that upon absence of update data, the display can be self-refreshed from the panel memory and other functions of the processor can be shut down.

DESCRIPTION OF PREFERRED EMBODIMENTS

Figure 1:
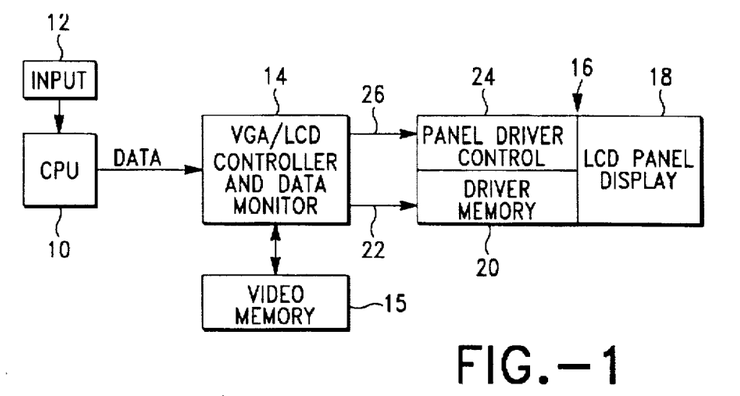
FIG. 1 is a simplified functional diagram of a computer system embodying principles of the present invention.

Illustrated in FIG. 1 are components of an information processing system, such as a personal computer, including a central processing unit or CPU 10 receiving input data from input equipment generally indicated at 12 which may include a conventional keyboard. The CPU feeds data and control signals to a VGA/LCD controller 14 which stores the data in its video memory 15. The VGA/LCD controller conventionally interfaces with the CPU and video memory and provides data output and data control to a display panel 16. The display panel includes an LCD display screen of any one of a number of well known types, such as an active matrix LCD display screen 18. The display panel also includes a display driver memory 20 that receives data from VGA/LCD controller 14 on lines generally indicated at 22, and further includes a panel driver control 24 receiving timing and control information from the VGA/LCD controller via a group of lines 26.

In normal operation the CPU interfaces with the system input to process the data, which are fed through the VGA/LCD controller to be stored in the video memory 15. The data in the video memory are processed by the VGA/LCD controller and fed to the driver memory 20. The latter contains a single frame of the information displayed on the LCD panel in a conventional vertical raster display, which may comprise, in a particular example, 640 columns by 200 lines. The VGA/LCD controller includes a sequencer which generates timing and control signals that are fed to the panel driver control, which in turn controls writing of data into driver memory 20 and read out of data from the driver memory to the LCD display screen 18. Both the driver memory and panel driver control 24 are formed on a single chip mounted on the LCD display panel itself. As will be described below, there are a number of chips 20,24 for operation of a full 640×200 pixel display.

VGA/LCD controller 14 includes a data monitor (shown in FIG. 4 and described more particularly below) that monitors update data, including data in the video memory and input data provided via the CPU, all of which is normally transmitted through the VGA/LCD controller for updating the LCD display screen. When the data monitor detects the absence of update data for a predetermined period, such as two frames, the system automatically goes into a power down or low power consumption mode in which image data stored in driver memory 20 are employed to refresh the LCD display and various operations of the VGA/LCD controller itself are shut down to conserve power. Thus the arrangement enables the system to automatically go into its power down mode whenever there is no update data either from the system memory or from input devices.

In a specific system wherein the data are defined by a multi-bit grey-scale code used to control a frame rate modulator that controls the data displayed on the LCD display, the power down mode includes a signal that commands the re-mapping of the grey-scale code to a two digit code that defines a two state or effectively black-and-white image signal stored in the driver memory 20.

Figure 2:
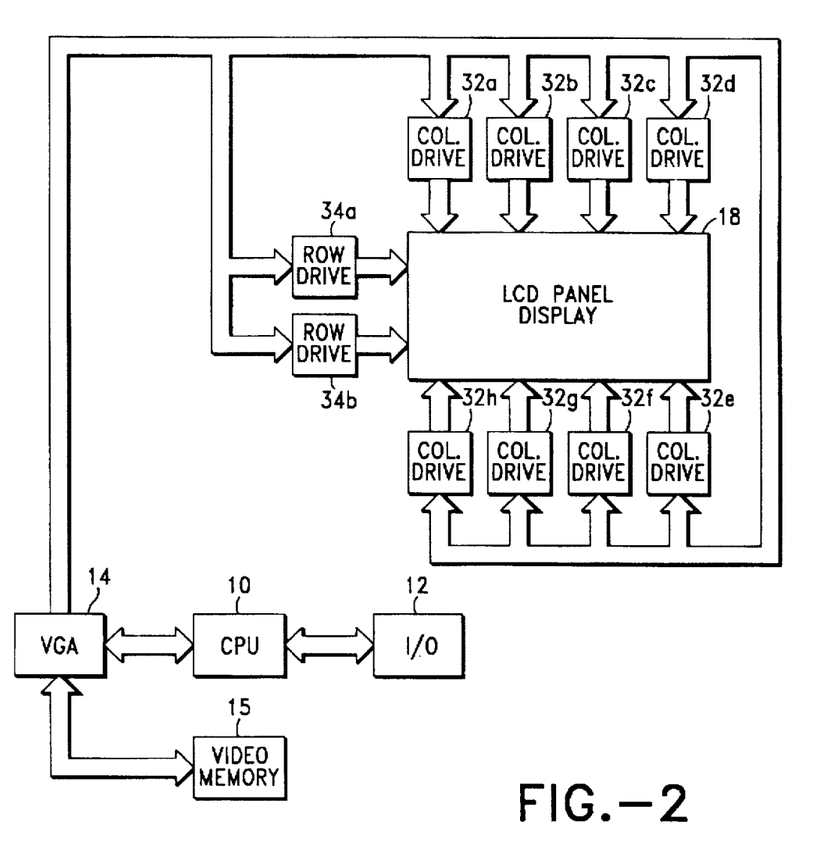
FIG. 2 is a more detailed block diagram of a computer system and a liquid crystal display panel and its drivers according to principles of the present invention.

FIG. 2 illustrates the overall organization of a display panel and its interface with the VGA/LCD controller, CPU and video memory, showing an arrangement employing a plurality of column drivers. CPU 10 interfaces with input/output devices such as keyboard 12 and also interface with VGA/LCD controller 14. Data and control signals are sent from the VGA/LCD controller to a plurality of column drivers 32a–32h and a plurality of row drivers 34a and 34b. In the exemplary arrangement described herein, solely for purposes of exposition, the LCD display panel 18, provides a display of 640×200 pixels. Column drive pads of the display are divided into 8 sections of 80 columns each. The display panel row driving pads are divided into 2 sections of 100 rows each. Thus, each of row drivers 34a and 34b drives 200 rows, and each of column drivers 32a–32h drives 80 columns. Each of the drivers 32a–32h and 34a and 34b is a separate single chip, all of which are mounted on the display panel, generally indicated at 16. The row drivers 34a and 34b are conventional drivers and need not be explained in detail.

Figure 3:
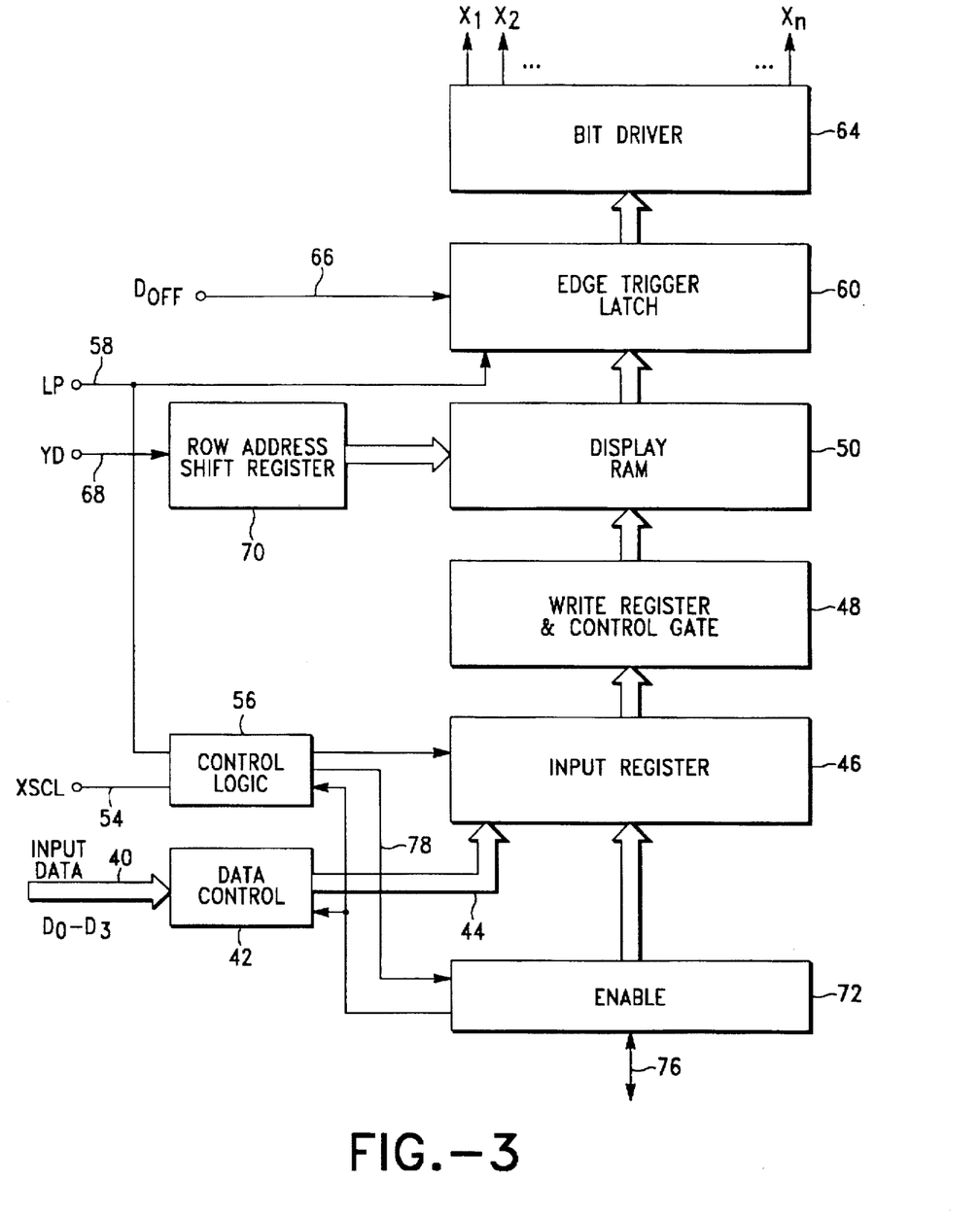
FIG. 3 is a block diagram of a single column driver of the group of panel drivers shown in FIG. 2.

Illustrated in FIG. 3 is a block diagram of a single one of the column drivers, such as, for example, column driver 32a. Since all column drivers are identical, a description of one will suffice to describe all. The several column drivers are enabled one at a time, and when enabled each will write 80 bits of data into its memory and read 80 bits from its memory into the appropriate panel driver pads. The individual column driver then goes into a stand-by mode while simultaneously enabling the next adjacent driver so that the 8 column drivers operate one at a time in succession until all 640 columns of the LCD display have been activated.

As illustrated in FIG. 3, input data, indicated as $D_0$–$D_3$, are fed via a bus 40 to a data control circuit 42, which outputs its data via a bus 44 to an input register 46. Data from the input register are fed to a write register and control gate 48 from which it is written into the column driver display RAM 50.

The data are transmitted in nibbles or groups of four successive data bits ($D_0$–$D_3$) which are shifted (4 bits or 1 nibble at a time) into the input register and write register under control of a data shift clock XSCL applied from the VGA/LCD controller via an XSCL clock line 54 to a column driver control logic circuit 56. Control logic circuit 56 provides a timing signal to input register 46 for the transfer of data to write register 48.

Timing signals provided by VGA/LCD controller 14 include a horizontal clock signal LP fed on an input line 58 to the column driver and which is sent to control logic circuit 56 and also to an edge trigger latch 60 which receives and latches data read out from the display RAM 50. The LP or horizontal clock signal triggers the latching of display data to the panel drive pads via bit driver circuit 64, having outputs $X_1$, $X_2$, through $X_n$ (wherein there are 80 outputs for an 80 column driver) for the individual display columns. A signal $D_{OFF}$, also fed from the VGA/LCD controller, is provided on a column driver input line 66 to turn the display on or off as desired. This signal is not employed in the power down mode.

A frame start or vertical clock signal YD is fed from the VGA/LCD controller on an input line 68 to initiate operation of a row address shift register 70 that controls the address of the display RAM rows into which the write register transfers its image data. The YD signal re-sets the address of the display RAM 50 to correspond to the start of a new frame. A counter in the row address registers shifts the address from row to row within each frame.

An enable circuit 72 communicates with adjacent column drivers of the group of column drivers 32a–32h by means of a line 76 to enable or disable the input register 46, control logic 56 and data control circuit 42. The enable signal is synchronized with the control logic timing by means of a signal fed from the control logic 56 to enable circuit 72 via a line 78.

Figure 4:
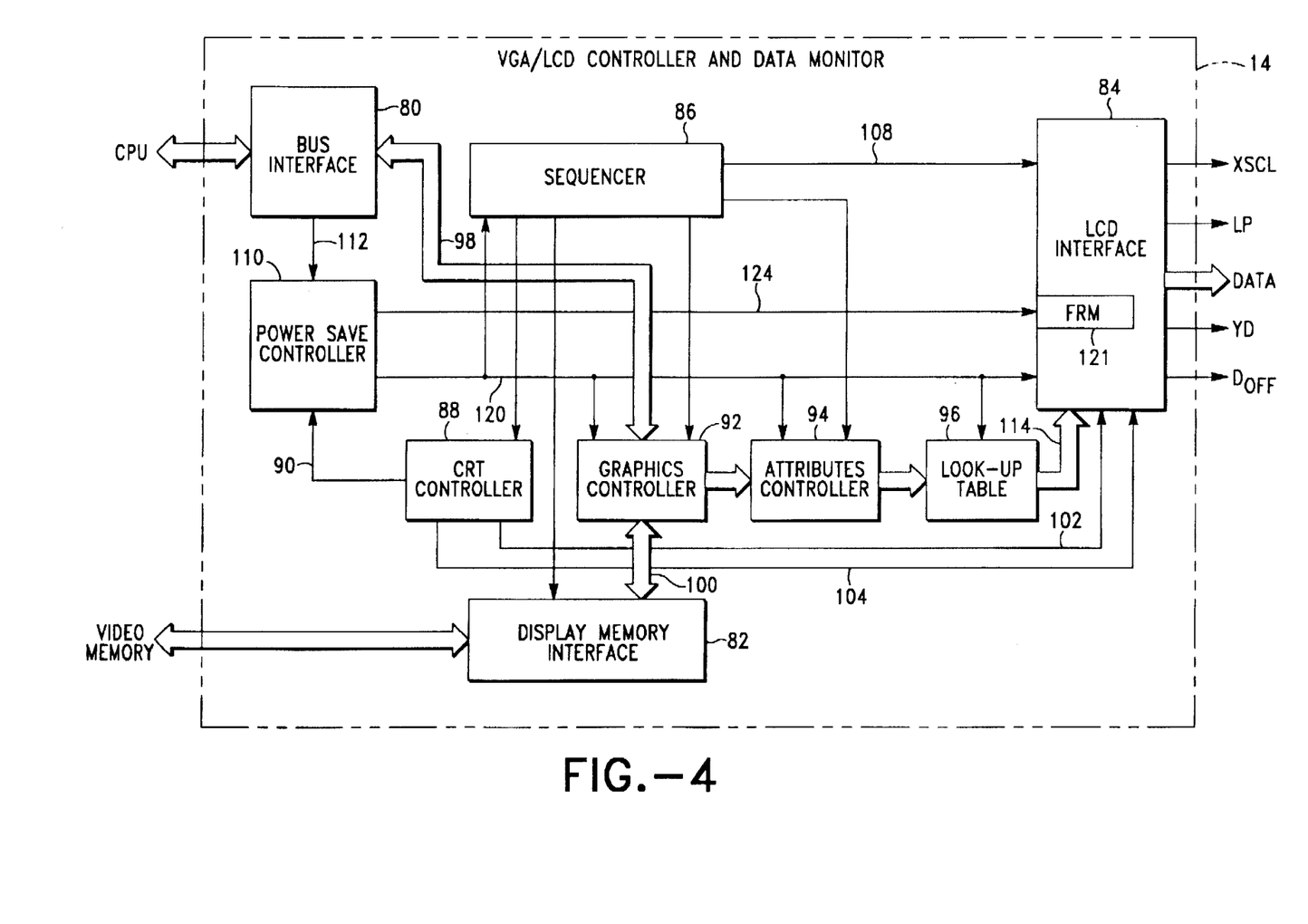
FIG. 4 is a block diagram of portions of a VGA/LCD controller employed in the computer system of FIGS. 1–3.

The VGA/LCD controller is shown with a number of its functional blocks in FIG. 4. The VGA/LCD controller includes a bus interface 80 that connects with the CPU 10, a display memory interface 82 that connects with the video memory, and an LCD interface 84 which connects with the display panel 16. A sequencer 86 provides initialization of timing and synchronization of the several VGA/LCD circuits. These circuits include a CRT controller 88 which generates an internal vertical timing pulse VRTC on a line 90. Also included in the VGA/LCD controller are a graphics controller 92, an attributes controller 94, and a look-up table 96, all under control of timing signals from the sequencer 86. The graphics controller communicates with the bus interface 80 via a bus 98 and with the display memory interface 82 via a bus 100. The CRT controller generates a vertical clock signal on a line 102 that is fed to LCD interface 84 to provide the vertical clock output YD from the interface. The CRT controller also generates a horizontal timing signal on a line 104 fed to the LCD interface 84 to provide the horizontal clock signal LP to the display panel. Sequencer 86 provides a pixel clock on a line 108 fed to the LCD interface, which in turn provides the pixel shift clock XSCL.

A power save controller 110 is included in the VGA/LCD controller to receive from the bus interface 80 on a line 112 a signal representing memory and I/O write. This is the data update signal which, when asserted, indicates data changes in the data path from the video memory, through display memory interface 82, through graphics controller 92, through attributes controller 94, through the look-up table 96, through bus 114 to the LCD interface from which the data bits $D_0$–$D_3$ are transmitted to the LCD display panel.

Power save controller 110 detects the absence of memory or I/O write update data for two full frames, and, via a line 120, effectively shuts off the data shift clock XSCL and shuts down graphics controller 92, attributes controller 94, and look-up table 96, also shutting down certain portions of the sequencer 86.

LCD interface 84 includes a conventional frame rate modulator 121 that receives the multi-bit grey-scale code. For each group of frames, equal in number to the number of levels of grey-scale grades denoted by the grey-scale code, the frame rate modulator turns on an individual pixel for a number of frames of such group of frames. The number of frames for which such pixel is turned on is effectively equal to the number denoted by the grey-scale code for that pixel. For example, considering a four bit grey-scale code denoting sixteen levels or grades of intensity of a given pixel, if a fifty percent intensity (level 7) is encoded in the grey-scale code for the pixel, the pixel is turned on for fifty percent (eight) of the (sixteen) frames of the group of frames. If the grey-scale code indicates a twenty-five percent grey-scale level (level 3), that pixel is turned on for only twenty-five percent (four) of the frames. If the grey-scale indicates a zero level, then that pixel is not turned on for any of the frames of the group. If maximum intensity is encoded in the grey-scale code, the individual pixel is turned on for all of the frames of such group.

The power save controller, upon sensing absence of update data for two full frames, sends a signal via a line 124 to frame rate modulator 121 in the LCD interface, causing a re-mapping of the grey-scale code to a simple black-and-white or two state pixel level signal. In the re-mapping, if all bits of the grey-scale code are zero, a zero output is provided to the frame rate modulator, which accordingly will not turn on the individual pixel for any frames of the group. If any one or more of the four bits (in the exemplary four bit grey-scale code that is used for this explanation) is a one, that is, for any grey-scale code number other than zero, a one is outputted to the frame rate modulator, which accordingly turns on the individual pixel for all frames of the group, thereby providing a maximum intensity. This re-mapping from multi-bit grey-scale code to black-and-white is necessary when the system goes into power down mode and the display is effectively self-refreshed from the column driver memory. Image data stored in the column driver display RAM 50 is only a single frame of information, and therefore the value of each pixel as it is repetitively displayed during the self-refreshing operation cannot vary as would be necessary for grey-scale display and frame rate modulation.

Power down mode will be described in detail below with reference to the timing diagram of FIG. 5. Briefly, however, the power down mode operates as follows. When the data shift clock XSCL is no longer fed to the column driver 32a, no new image data is written into the RAM 50 and the image data already stored in the internal display RAM 50 of the column driver is repetitively read out to refresh the LCD panel display. If there is no memory write or I/O write for at least two frames (as measured by the internal vertical clock signal VRTC on line 90, see FIG. 4), the pixel outputs are first re-mapped from grey-scale to black-and-white. Then, at the second following vertical frame pulse, the panel driver enters self-refresh mode, stopping the pixel shift clock and ensuring that one complete frame of black-and-white pixels is stored in the display RAM 50. At this point various blocks in the VGA/LCD controller are shut down, such as the graphics controller, the attributes controller, and parts of the LCD interface. In addition, sequencer 96 may also be caused to enter a screen off mode to reduce memory interface activity and to provide maximum CPU bandwidth.

The power down mode is entered automatically and within two full frames. It is also automatically terminated upon occurrence of a memory write or an I/O write. Upon such occurrence the disabled VGA/LCD controller blocks are first enabled at the next internal VRTC pulse. Thereafter at the next vertical frame clock (YD) pulse the data shift pulse XSCL is re-enabled so that the panel driver leaves the self-refresh mode. This automatic initiation and termination of power down mode is continually repeated as long as the power save controller and its power down mode operations are enabled. The power down mode is preferably enabled under a manual control (not shown) of the user, and under many conditions of computer operation may actually result in the entire computer system being in this power down mode for a majority of its operation, thereby producing significant energy saving. For example, when inputting data from a keyboard, the operator will often pause momentarily. Whenever such a pause occurs for at least two frames (where system frame rate is in the order of 70 frames per second), the system goes into power down mode automatically and remains there until data is again inputted.

Figure 5A:
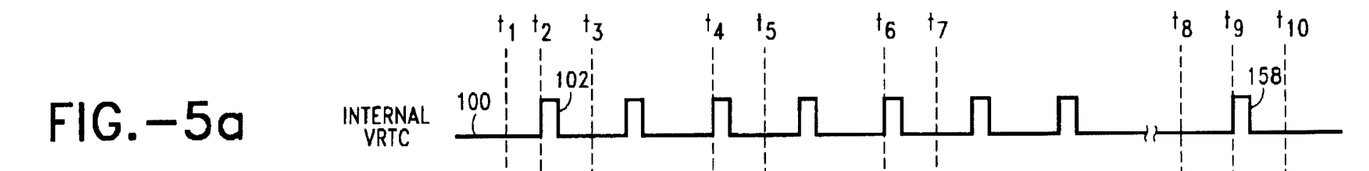
FIGS. 5a–5f form a timing chart showing certain timing that is helpful in understanding operation of the present invention.
Figure 5B:
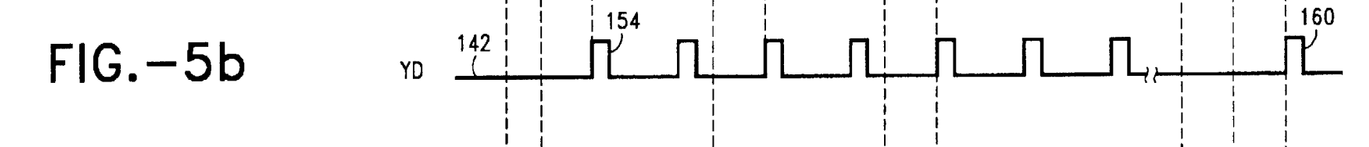
Figure 5C:
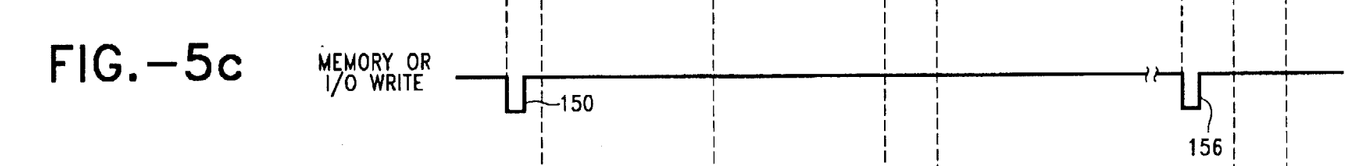
Figure 5D:
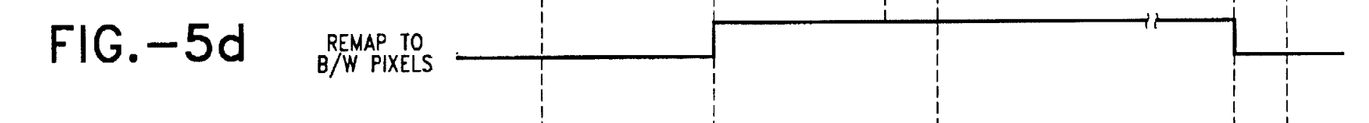
Figure 5E:
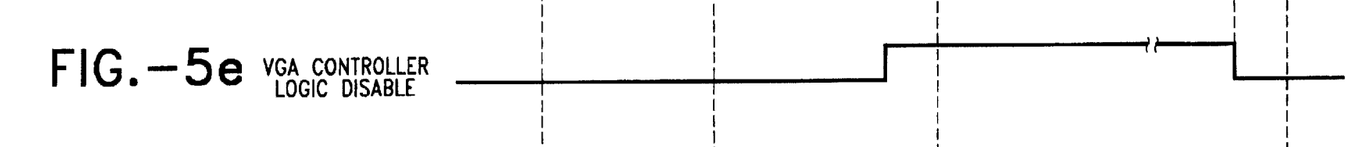
Figure 5F:
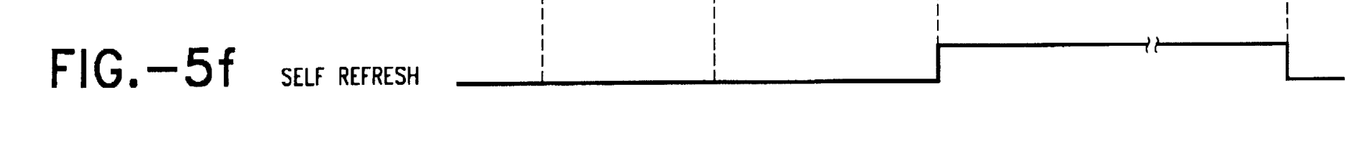

FIGS. 5a–5f effectively form a timing diagram illustrating relative timing of various operations of the circuitry described above. FIG. 5a shows the internal VRTC timing pulse at 140. FIG. 5b shows the vertical frame clock pulse YD at 142. Memory or I/O write is shown in FIG. 5c, and the timing of re-mapping from grey-scale to black-and-white pixels is shown in FIG. 5d. Disabling and enabling of the VGA/LCD controller logic is shown in FIG. 5e, and operation of the self-refresh mode of the column driver is shown in FIG. 5f. Significant times are indicated at the upper portion of the chart as times $t_1$–$t_{10}$. It is assumed, of course, that the entire power save mode has been enabled and that memory or input write data update pulses 150 are being monitored. VRTC pulses 152, which occur at the same repetition rate as vertical YD clock pulses 154 are slightly earlier than the vertical YD clock pulses 154. Assuming that the most recent memory or input/output write pulse 150 has occurred at a time $t_1$, the following VRTC pulse occurs at time $t_2$, and if no additional memory or I/O write pulse 150 occurs before the next two VRTC pulses, at time $t_4$, the power save controller initiates power save mode by sending a re-map signal on line 124 (FIG. 4) to the frame rate modulator (121) so that re-mapping of grey-scale code to black-and-white is initiated at time $t_4$, as shown in FIG. 5d. The system now waits for two full frame periods, that is, from time $t_4$ to time $t_5$, the second next VRTC pulse. During this time the display RAM 50 continues to receive input data. However, the input data to the display RAM is black-and-white during these two frames and is no longer grey-scale coded for frame rate modulation. Thus, the display RAM receives and stores one full frame of black-and-white image data. Now, at time $t_6$, shift clock XSCL is stopped and the various VGA/LCD controller logic blocks, including the graphics controller, the attributes controller, the look-up table, and portions of the sequencer 86, may be disabled, as indicated in FIG. 5e. During the period $t_1$–$t_6$ the display RAM memory is under control of the vertical clock YD and the horizontal clock LP, which continue to be transmitted from the VGA/LCD controller to the column drivers. Accordingly, at time $t_6$ when the VGA/LCD controller logic is disabled and the shift clock XSCL is stopped, the display panel waits until the next frame pulse YD, which occurs at time $t_7$, and then starts the self-refresh mode in which the display panel is continually refreshed from the black-and-white image information in the display RAM 50. In the self-refresh mode the single frame of black-and-white image data is repetitively read out of RAM 50 under control of horizontal and vertical clocks LP and YD. This self-refresh operation and the power down mode continues until another memory or input/output write pulse is detected. Upon detection of a data update pulse 156, at time $t_8$, for example, the system effectively terminates the power down mode so that at time $t_9$, which is the VRTC pulse 158 that follows the reappeared data update pulse 156, the re-mapping of grey-scale code to black-and-white is terminated, and the system goes back to the grey-scale mapping for frame rate modulation. Similarly, at time $t_9$, the disabling of the VGA/LCD controller logic blocks is terminated, and all VGA/LCD controller systems are back to normal operation. The self-refresh mode, which is frame synchronized from the vertical clock pulses YD, waits until time $t_{10}$ for the next YD pulse 160 and thereupon terminates the self-refresh mode, as indicated in FIG. 5f.

Upon termination of the power down mode the various clock signals must be synchronized. This is readily accomplished by utilizing the conventional sequencer reset operation without shutting off the power. Accordingly, the sequencer may go into its reset operation upon termination of the power down mode. Alternatively, the several timing signals may be monitored and re-synchronized without initiating a full sequencer reset. The termination of the power down mode and the re-enabling of the VGA/LCD controller logic is initiated at $t_9$ in response to the internal VRTC clock, which occurs well before the termination of the self-refresh mode at $t_{10}$ when data is obtained from the video memory.

Of course it will be obvious to those of ordinary skill in the relevant art, after study of the description set forth above in conjunction with the drawings, that principles, features and methods of operation of the described power saving apparatus and methods may be readily applied to other systems and devices, including but not limited to intelligent devices incorporating a display, embedded micro-controllers incorporating a user display, and intelligent input/output processing mechanisms including a display.

What is claimed is:

1. A power saving computer system comprising:

an information processor for storing and processing information, comprising:

a display controller for generating frames of update data, each frame of update data including a plurality of grey-scale pixel data groups, each pixel data group having an n-bit signal defining one of a plurality of grey-scale brightness grades;

a power-saving circuit responsive to absence of a predetermined number of frames of update data for temporarily disabling portions of said information processor; and remapping means in communication with said display controller and said power-saving circuit for remapping the grey-scale pixel data groups of a current frame of update data into corresponding black-and-white pixel data defining only one of two brightness grades in response to the absence of update data; and a display panel for selectively receiving the frames of update data from said information processor to generate an image on a panel screen, comprising:

a panel memory in communication with said display controller for storing at least the remapped current frame of update data; and refresh means in communication with said panel memory, said display controller, and said power-saving circuit to self-refresh the panel screen from update data stored in said panel memory in response to the absence of update data.

2. The computer system of claim 1 including means for re-enabling said portions of said information processor upon reoccurrence of said update data.

3. The computer system of claim 1 wherein said display panel further comprises a panel driver connected to transmit panel display control information from said display controller to said panel memory.

4. The computer system of claim 3 wherein said display controller includes timing means for generating a vertical timing signal, a horizontal timing signal, and a data shift signal;

wherein said panel driver includes means for receiving the timing signals and controlling flow of update data into and out of said panel memory in response to the timing signals;

wherein the data shift signal controls transmission of update data from said display controller into said panel memory, said power-saving circuit including means for temporarily disabling transmission of the data shift signal to said panel driver; and wherein said display panel further comprises means for repetitively transferring information stored in said panel memory to said display panel under control of said horizontal and vertical timing signals.

5. The computer system of claim 1, further comprising means for transmitting at least one full frame of black-and-white data to said panel memory after remapping the current frame of update data.

6. The computer system of claim 1, further comprising means for storing one full frame of said black-and-white signal output in said panel memory.

7. The computer system of claim 1, wherein said display controller comprises a VGA/LCD controller having a sequencer; and wherein said power-saving circuit includes means for disabling portions of said sequencer.

8. The computer system of claim 7 wherein said VGA/LCD controller includes a graphics controller, an attributes controller, and a look-up table, and wherein said power-saving circuit further includes means for disabling said graphics controller, said attributes controller and said look-up table.

9. A power saving computer system comprising:

an information processor for storing and processing information and including a display controller;

a display panel for receiving frames of update data from said information processor;

means responsive to absence of a predetermined number of frames of update data for temporarily disabling portions of said information processor; and means for re-enabling said portions of said information processor upon reoccurrence of said update data, ·wherein said display panel includes a panel screen and a panel driver memory connected to store and transmit data from said information processor to said panel screen, and means for causing said panel driver memory to self-refresh said panel screen from data stored in said panel driver memory in response to the absence of update data;

wherein said display panel includes a panel screen and a panel driver memory connected to store and transmit data from said information processor to said panel screen and including a panel driver connected to transmit panel display control information from said information processor to said panel driver memory;

wherein said information processor includes means for generating a vertical timing signal, a horizontal timing signal, and a data shift signal, wherein said panel driver includes means for receiving said timing signals and controlling flow of data into and out of said panel driver memory in response to said timing signals, and wherein said data shift signal controls transmission of data from said information processor into said panel driver memory, said means responsive to absence of update data including means for temporarily disabling transmission of said data shift signal to said panel driver, and including means for repetitively reading information stored in said panel driver memory to said display panel under control of said horizontal and vertical timing signals; and wherein said data includes a plurality of grey-scale pixel data groups each having an n-bit signal defining one of a plurality of grey-scale brightness grades, and grey-scale means in said information processor for causing said panel driver and panel driver memory to control said panel screen according to the brightness grade of the pixel data group of said data signal, said means for temporarily disabling including means for re-mapping said grey-scale means to provide a black-and-white signal output that controls said panel screen to display pixels having only one of two brightness grades.

10. In a computer system having an information processor that receives and processes information and transmits a data signal together with control and timing signals to a display panel for displaying frames of data, said information processor including a grey-scale controller for providing data defining a grey-scale display, wherein said control and timing signals include a data shift clock, a horizontal clock, and a vertical clock, and wherein said display panel includes a panel screen, a panel driver memory responsive to said data signal for storing at least one frame of said data, and a panel driver responsive to said control and timing signals for controlling said panel driver memory to read data from said panel driver memory to said panel screen, a method for reducing power consumption of said computer system, comprising the steps of:

monitoring transmission of said data signal from said information processor to said display panel; and     causing said computer system to enter a power down mode upon detection of the absence of transmission of said data at a signal to said display panel for a predetermined number of frames of data, said step of causing said computer system to enter a power down mode comprising:

disabling parts of said information processor;

changing operation of said grey-scale controller to cause it to provide data defining a black-and-white display to said panel driver memory;

waiting for at least two full frames after detection of the absence of transmission of said data signal to ensure storage of one complete frame of black-and-white data in said panel driver memory; disabling transmission of said data shift clock to said panel driver; and         entering a self-refresh mode, said self-refresh mode comprising the steps of repetitively reading a frame of data from said panel driver memory to said panel screen under control of said horizontal and vertical clock signals.

11. The method of claim 10 wherein said control and timing signals include an internal vertical clock having a vertical clock period, said step of detection of the absence of transmission of said data signal comprising monitoring presence or absence of said data signal for a time interval that is an integral multiple of said vertical clock period, waiting at least two additional vertical clock period upon detection of the absence of transmission of said data signal, at the end of said two additional vertical clock period performing said steps of disabling parts of said information processor and disabling said data shift clock, and at the second vertical clock following the end of said two additional internal vertical clock periods, initiating a self-refresh operation by repetitively reading a frame of data stored in said panel driver memory to said panel screen under control of said horizontal and frame clocks.

12. The method of claim 10 wherein said computer system includes a sequencer, and wherein said step of causing said computer system to enter a power down mode comprises disabling parts of said sequencer.

13. A video display system, comprising:

a video display for displaying a grey-scale image specified by plural frames of video data, said video display having a first operating mode and a second operating mode consuming less power than the first operating mode;

a conversion means for converting a given frame of video data comprising plural sequences of grey-scale image data into corresponding two-state image data; and     control means for controlling the video display to switch from the first operating mode to the second operating mode in response to non-receipt of a predetermined number of consecutive frames of the video data for a predetermined period of time, in which the control means controls the video display to display a two-state image specified by the converted given frame of video data.

14. A system as in claim 13, in which the control means controls the video display to switch from the first operating mode to the second operating mode in response to non-receipt of two consecutive frames of video data.

15. A system as in claim 13, in which:

the video display receives update pulses together with said frames of video data respectively; and     the control means controls the video means to switch from the first operating mode to the second operating mode in response to non-receipt of a predetermined number of consecutive update pulses.

16. A system as in claim 13, in which:

the video display comprises a frame memory for storing a frame of video data including the converted given frame of video data; and     the control means controls the video display to repetitively read out and display the converted given frame of video data stored in the frame memory when the video display has been switched to the second operational mode.

17. A method for reducing power consumption in a video display system, comprising:

(a) providing a video display for displaying a grey-scale image specified by plural frames of video data, the video display having a first operating mode, and a second operating mode that consumes less power than the first operating mode;

(b) converting a given frame of video data comprising plural sequences of grey-scale image data into corresponding two-state image data; and     (c) controlling the video display to switch from the first operating mode to the second operating mode in response to non-receipt of a predetermined number of consecutive frames of the video data for a predetermined period of time, in which the control means controls the video display to display a two-state image specified by the converted given frame of video data.

18. A method as in claim 17, in which step (c) comprises controlling the video display to switch from the first operating mode to the second operating mode in response to non-receipt of two consecutive frames of video data.

19. A method as in claim 17, in which:

the video display receives update pulses together with said frames of video data respectively; and     step (c) comprises controlling the video display means to switch from the first operating mode to the second operating mode in response to non-receipt of a predetermined number of consecutive update pulses.

20. A method as in claim 17, in which:

the video display comprises a frame memory for storing a frame of video data including the converted given frame of input data; and     step (c) comprises controlling the video display to repetitively read out and display the converted given frame of video data stored in the frame memory when the video display has been switched to the second operational mode.

21. A video display system, comprising:

a video display for displaying a grey-scale image specified by plural frames of video data, said video display having a first operating mode and a second operating mode consuming less power than the first operating mode;

a conversion means for converting a given frame of video data comprising plural sequences of N bit per pixel image data into corresponding one bit per pixel image data, wherein N is greater than one; and control means for controlling the video display to switch from the first operating mode to the second operating mode in response to non-receipt of a predetermined number of consecutive frames of the video data for a predetermined period of time, in which the control means controls the video display to display a one bit per pixel image specified by the converted given frame of video data.

22. A method for reducing power consumption in a video display system, comprising:

(a) providing a video display for displaying an N bit per pixel image specified by plural frames of video data, the video display having a first operating mode, and a second operating mode that consumes less power than the first operating mode;

(b) converting a given frame of video data comprising plural sequences of N bit per pixel image data into corresponding one bit per pixel image data, wherein N is greater than one; and (c) controlling the video display to switch from the first operating mode to the second operating mode in response to non-receipt of a predetermined number of consecutive frames of the video data for a predetermined period of time, in which the control means controls the video display to display a one bit per pixel image specified by the converted given frame of video data.

* * * * *

UNITED STATES PATENT AND TRADEMARK OFFICE
CERTIFICATE OF CORRECTION

PATENT NO.   : 5,757,365
DATED        : May 26, 1998
INVENTOR(S)  : Simon Ho

It is certified that error appears in the above-identified patent and that said Letters Patent is hereby corrected as shown below:

Title page, item [56], under Foreign Patent Documents, change "0645692" to -- 0645691--.

Signed and Sealed this

Eighth Day of September, 1998

Attest:

BRUCE LEHMAN

*Attesting Officer*               *Commissioner of Patents and Trademarks*